United States Patent [19]

Pine et al.

[11] 3,819,878

[45] June 25, 1974

[54] TRANSMISSION TEST SET FOR TELEPHONE CIRCUIT DATA COMMUNICATION SYSTEMS

[75] Inventors: Buddie J. Pine, Palo Alto; John R. Carter, San Jose, both of Calif.

[73] Assignee: Antekna, Inc., Mountain View, Calif.

[22] Filed: Dec. 18, 1972

[21] Appl. No.: 316,017

[52] U.S. Cl. .......... 179/175.3 R

[51] Int. Cl. .......... H04b 3/46

[58] Field of Search .. 179/175.3 R, 15 BF, 175.2 C, 179/175.31 R; 178/69 A, 69 R; 340/146.1 E

[56] References Cited

UNITED STATES PATENTS

| | | | |
|---|---|---|---|
| 3,036,290 | 5/1962 | Zarouni | 178/69 A |
| 3,045,061 | 7/1962 | Slayton | 178/69 A |
| 3,069,498 | 12/1962 | Frank | 178/69 A |
| 3,371,165 | 2/1968 | Earle et al. | 179/175.3 |
| 3,562,710 | 2/1971 | Halleck | 340/146.1 E |
| 3,596,245 | 7/1971 | Finnie | 340/146.1 E |
| 3,655,915 | 4/1972 | Liberman et al. | 179/2 DP |
| 3,692,939 | 9/1972 | Knight et al. | 179/15 BF |
| 3,737,584 | 6/1973 | Kaneko et al. | 179/175.31 R |

*Primary Examiner*—Kathleen H. Claffy
*Assistant Examiner*—Douglas W. Olms
*Attorney, Agent, or Firm*—Limbach, Limbach & Sutton

[57] ABSTRACT

A transmission test and apparatus for automatically detecting a fault in a telephone circuit data communications system and for automatically sequencing through various tests for isolating the fault. Test sets are provided at each end of the data communication circuit and cooperate to automatically test both modems and the telephone circuit between them as well as performing additional tests on the test sets themselves and on the entire communications systems. Each test set contains a pseudo-random test pattern generator and receiver. Housekeeping status and command messages are transmitted between test sets by way of two frequency tones and by a digital message that is inserted periodically into the pseudo-random test pattern in a manner to be discriminated therefrom.

12 Claims, 11 Drawing Figures

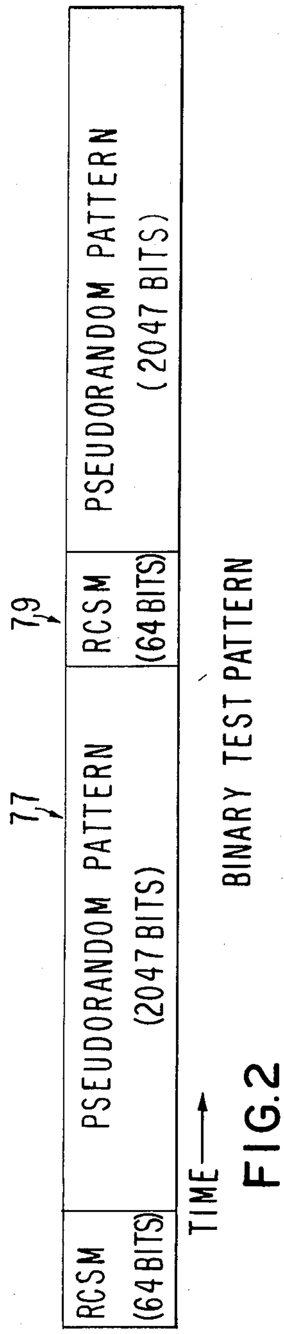
BINARY TEST PATTERN
FIG. 2
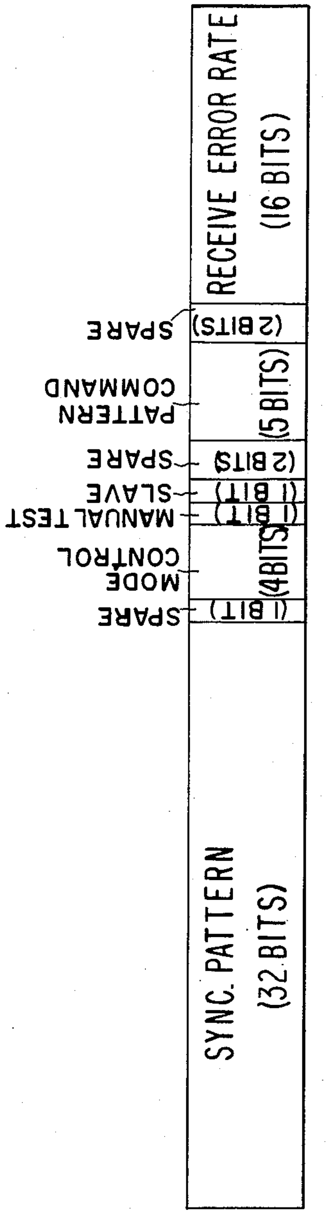
REMOTE COMMAND/STATUS MESSAGE (RCSM)
FIG. 3
MODE CONTROL WORDS
| | |
|---|---|
| FULL TEST (FT) | 1000 |
| LINE TEST (LT) | 0100 |
| REMOTE MODEM TEST (LMT2) | 0010 |
| LOCAL MODEM TEST (LMT1) | 0001 |
FIG. 4
PSEUDORANDOM TEST PATTERN COMMAND WORD
| | |
|---|---|
| 2047 BITS | 00000 |
| 1 | 10000 |
| 0 | 01000 |
| 1/0 | 00100 |
| 63 BITS | 00010 |
| 511 BITS | 00001 |
FIG. 5

TRANSMISSION TEST SET FOR TELEPHONE CIRCUIT DATA COMMUNICATION SYSTEMS

CROSS-REFERENCE TO A RELATED APPLICATION

This application is related to an application Ser. No. 315,844 by Robert L. Draper and Fred M. Rasmussen entitled TRANSMISSION TEST SET FOR TELEPHONE CIRCUIT DATA COMMUNICATION SYSTEMS filed concurrently herewith.

BACKGROUND OF THE INVENTION

This invention is related generally to communication testing techniques and more specifically to such techniques as applied to binary data communications systems that utilize ordinary telephone transmission circuits.

Binary data communication over normal telephone voice communication circuits is becoming increasingly popular. Two binary data terminals, such as two computers, located quite a distance from one another, are connected through available telephone circuits. As an interface between each data terminal, which emits messages in binary signal form, and the telephone circuit, which transmits a relatively narrow band voice frequency range, a telephone modem is inserted. The modem converts the binary signals to voice range signals. When a fault occurs in the telephone communication circuit, one of the modems, or in a data terminal, it is presently a time-consuming endeavor to locate the fault once it is initially discovered that data is no longer being satisfactorily communicated between the data terminals. Such down time is inconvenient and costly since most binary data communication systems require operable data communication for a very large portion of the time.

Therefore, it is a primary object of the present invention to provide a method and apparatus for quickly determining the reason for failure of such data communication so that the telephone company, the modem repairman or the data terminal repairman may be contacted for quick repair to restore the data communication capability of the entire system.

It is another object of the present invention to provide a method and apparatus that is simple of operation to isolate the cause of transmission failure.

It is still another object of the present invention to provide a transmission test apparatus for quick and easy connection with existing commercially available modems and data terminals.

SUMMARY OF THE INVENTION

Briefly, these and additional objects are accomplished by the present invention wherein existing interchange circuits between a modem and terminal are monitored to detect a failure in the system. The data communication circuits between the modem and terminal are not affected by the testing method and apparatus of the present invention until a fault is detected for a predetermined period of time as a result of monitoring said interchange circuits. When such a fault is detected, a testing apparatus automatically switches the transmit and receive lines of the modem from connection with the data terminal and to connection with internal test pattern transmitters and receivers of the test apparatus. Simultaneously with the test set at one end of a data communication circuit taking over the line, a signal is emitted to a similar test apparatus at the opposite end of the communication circuit to switch it into a test mode, whereby the data transmission and receive lines from the modem at the opposite end of the line are connected to the test pattern transmitter and receiver circuits.

When the testers have taken over the system in response to a detected fault, pseudo-random test patterns are generated and alternately looped back at various positions along the communications circuit. The test apparatus at one end of the line is designated as the "master" and the test apparatus at the opposite end as the "slave." Control circuitry in the master test apparatus automatically sequences both the master and the slave testers through various tests at various positions along the line.

Once the test sets have taken over the communications system from the data terminals, communication between them for command and status messages is accomplished by a binary signal which occurs for a short time at periodic intervals during the sending of the pseudo-random test pattern. In a specific embodiment to be described, the status and command message accounts for about 3 percent of the time that testing is taking place. Repetitive sending of a command and status message at short intervals eliminates the necessity of feedback between the test sets to confirm that one has obeyed the command of another. If such obeyance does not occur, the next repetitive command and status message occurring a very short time later is likely to bring about the desired actions.

The test apparatus according to the present invention remains transparent to data transmission until a fault in the system is detected for a predetermined amount of time, thereby normally not interferring with data transmission. False keying of the test apparatus from the normal data transmission mode into a test mode is rendered practically impossible by the use of a two frequency tone which must be detected by the remote tester for a preset period of time before data transmission is interrupted by the test sets. Furthermore, the command and status binary message which is sent after a test has been initiated contains checks so that an incorrect command and status message is identified and ignored while only those satisfying certain criteria are accepted for testing action. The result of these features is a testing method and apparatus which operates with an extremely high degree of reliability and minimization of interference with normal data transmission between the data terminals.

When the testing apparatus has taken over the communications circuit, the same pseudo-random test pattern that is sent by the test pattern generator is also generated in the test set receive section. The pattern received through a portion of the communication circuit from the transmitter is then compared with that generated by the receiver. The number of bits positively compared between any two successive errors are counted. When the number of positive comparisons exceeds a certain set number, such as 10,000 consecutive bits, within a fixed period of time, such as 50 seconds, the test set notes that a given test has passed and then automatically sequences the apparatus to conduct a test along a different segment of the communication circuit. This occurs until a test fails, thus indicating the location of the fault in the communication system. If a full system test passes, then the system is automatically returned to the data mode wherein the test sets again become transparent and communication between the data terminals at the opposite ends of the communication circuit is resumed.

Additional objects, advantages and features of the various aspects of the present invention will become apparent from the following description of a preferred embodiment thereof which should be taken in conjunction with the accompanying drawings.

BRIEF DESCRIPTION OF THE DRAWINGS

FIG. 2 indicates the relative occurrence of a pseudorandom binary test pattern and a remote command/status message (RCSM);

FIGS. 3, 4 and 5 illustrate a particular binary bit pattern of the RCSM:

DESCRIPTION OF THE PREFERRED EMBODIMENT

Figures 1A, 1B:
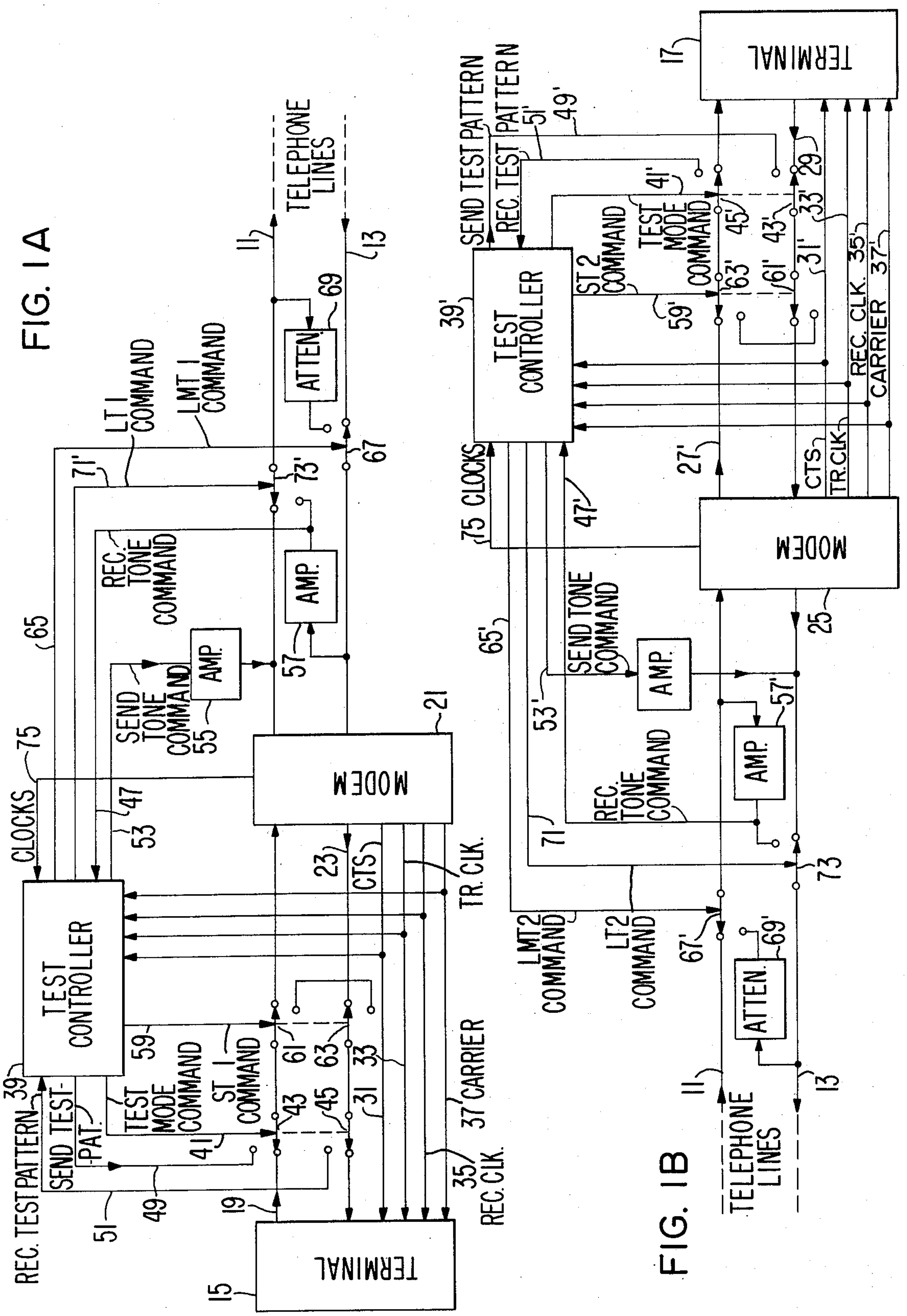
FIGS. 1A and 1B illustrate generally the use of testing apparatus according to the present invention with an existing communication circuit.

Referring to FIGS. 1A and 1B, the connection of a transmission test set according to a preferred embodiment of the present invention with a data communication system is generally shown. One end of the communication circuit illustrated in FIG. 1A sends data along a telephone circuit 11 to the terminal equipment of FIG. 1B. Conversely, the equipment of FIG. 1B sends data along a telephone circuit 13 to the equipment of FIG. 1A. A data terminal 15, such as a digital computer, communicates with a data terminal 17, such as another digital computer, at the opposite end of the circuit. The terminal 15 sends its messages in digital form along a circuit 19 to a telephone modem 21. As is well known, the function of the modem 21 is to convert the binary data in the line 19 into a signal within the limited voice frequency spectrum of the telephone circuit 11. Similarly, the signal in the telephone line 13 is converted by the modem 21 into a binary signal in a line 23 which is then received by the terminal 15. Similarly, at the opposite end of the circuit, a telephone modem 25 interfaces the telephone circuit 11 with a digital signal receive circuit 27 that is provided to the terminal 17. A digital circuit signal 29 transmitted by the terminal 17 is interfaced by the modem 25 with the telephone circuit 13.

A well known standard of the Electronic Industries Association entitled, "Interface Between Data Processing Terminal Equipment and Data Communication Equipment" sets forth standards of connection between modems (data communication equipment) and terminals (data processing terminal equipment). There are many control and status signals that are passed between the terminal and modem at one end of a telephone communication circuit other than the actual data that is being transmitted. A few status signals that are utilized in the particular embodiment of the invention being described are shown in FIG. 1A as being carried by circuits 31, 33, 35 and 37 of FIG. 1A, with counterpart circuits denoted by similar prime reference characters in FIG. 1B. The circuit 31 carries the standard Clear to Send (CTS) signal, the circuit 33 the standard Transmitter Signal Element Timing Signal (Tr. Clk.) the line 35 the Receiver Signal Element Timing signal (Rec. Clk.) and the circuit 37 carries the standard Data Carrier Detector signal. These four status signals, of the many circuits interconnecting a usual terminal and modem installation, are illustrated in FIGS. 1A and 1B because they are utilized by the testing apparatus in the embodiments being described.

The terminal, modems, telephone lines and interconnections between the modems and terminals that have been described are of a type typical of any data communication system. The portions of FIGS. 1A and 1B in addition to this, and which will now be described, make up the testing apparatus according to the specific embodiment utilizing the various aspects of the invention being described. Although the testing apparatus as shown in FIGS. 1A and 1B is broken into its many components for ease in functional description thereof, it will be noted that it is preferred for all components of the testing apparatus to be included in a single small package which may be physically located adjacent the modem for manual operation thereof, if desired, and observation of its indicating panel lights.

Figure 6A:
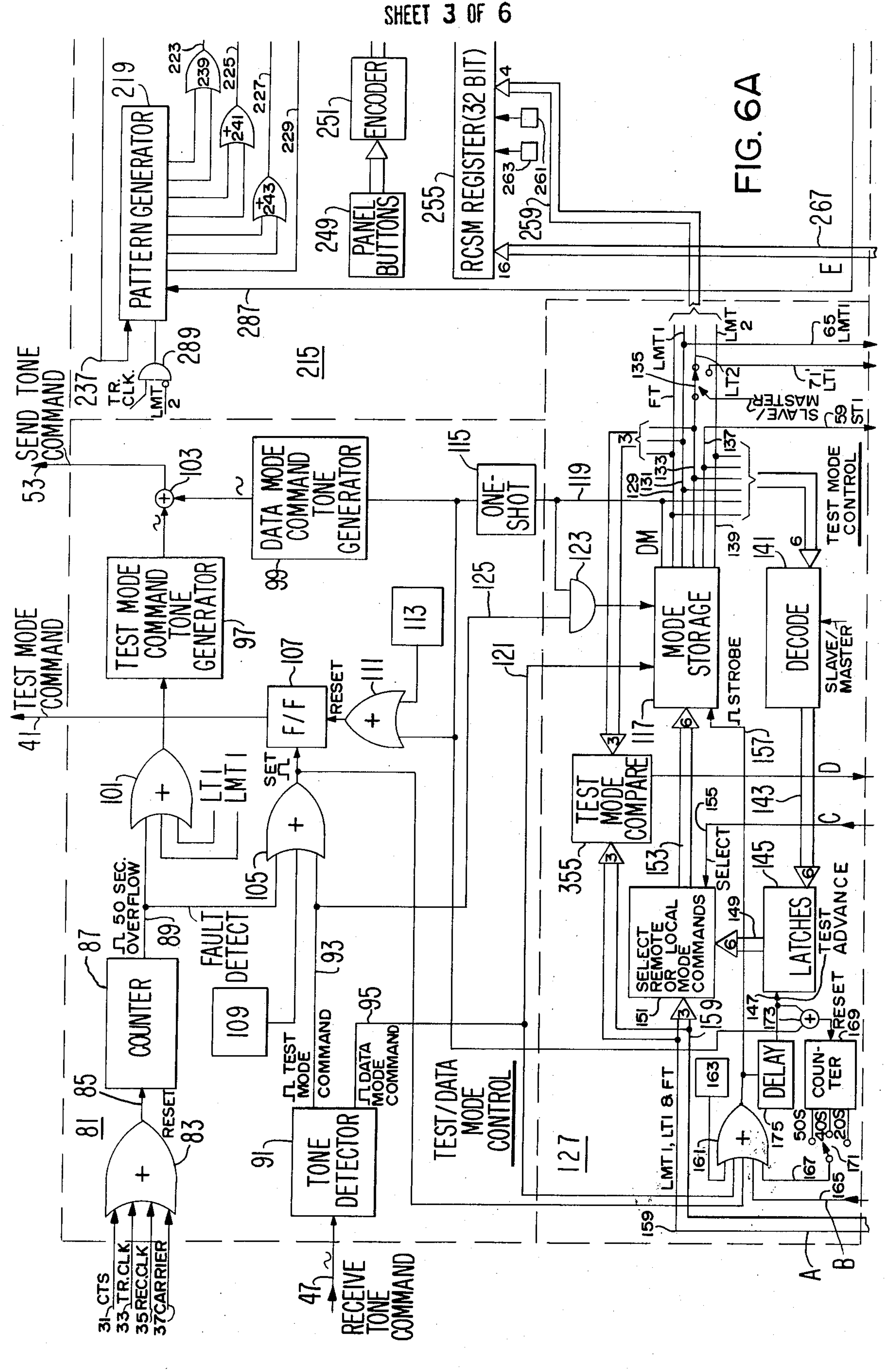
FIGS. 6A, 6B, and 6C illustrate in block diagram form a preferred test controller of FIG. 1 according to the present invention.
Figure 6B:
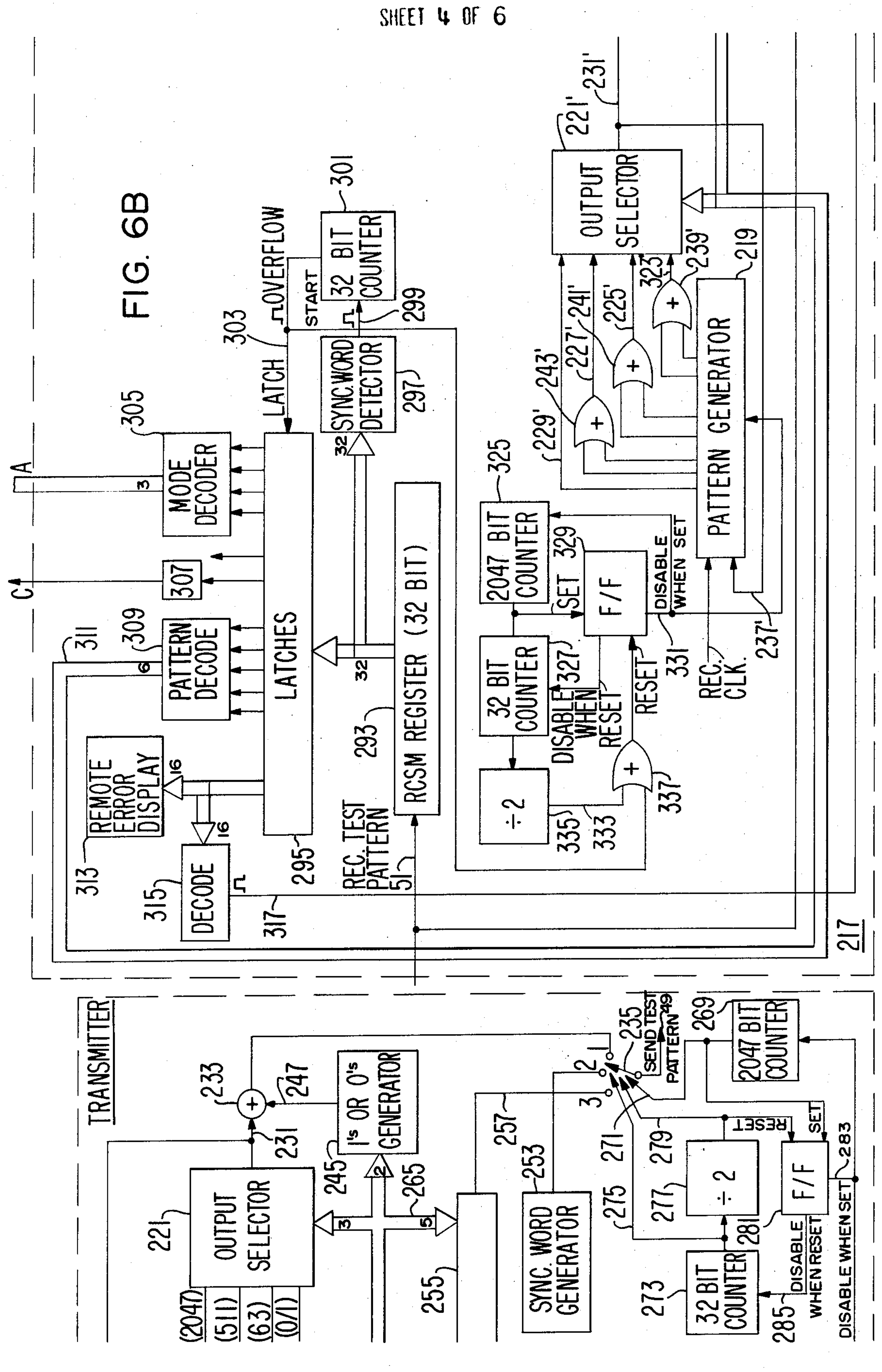
Figure 6C:
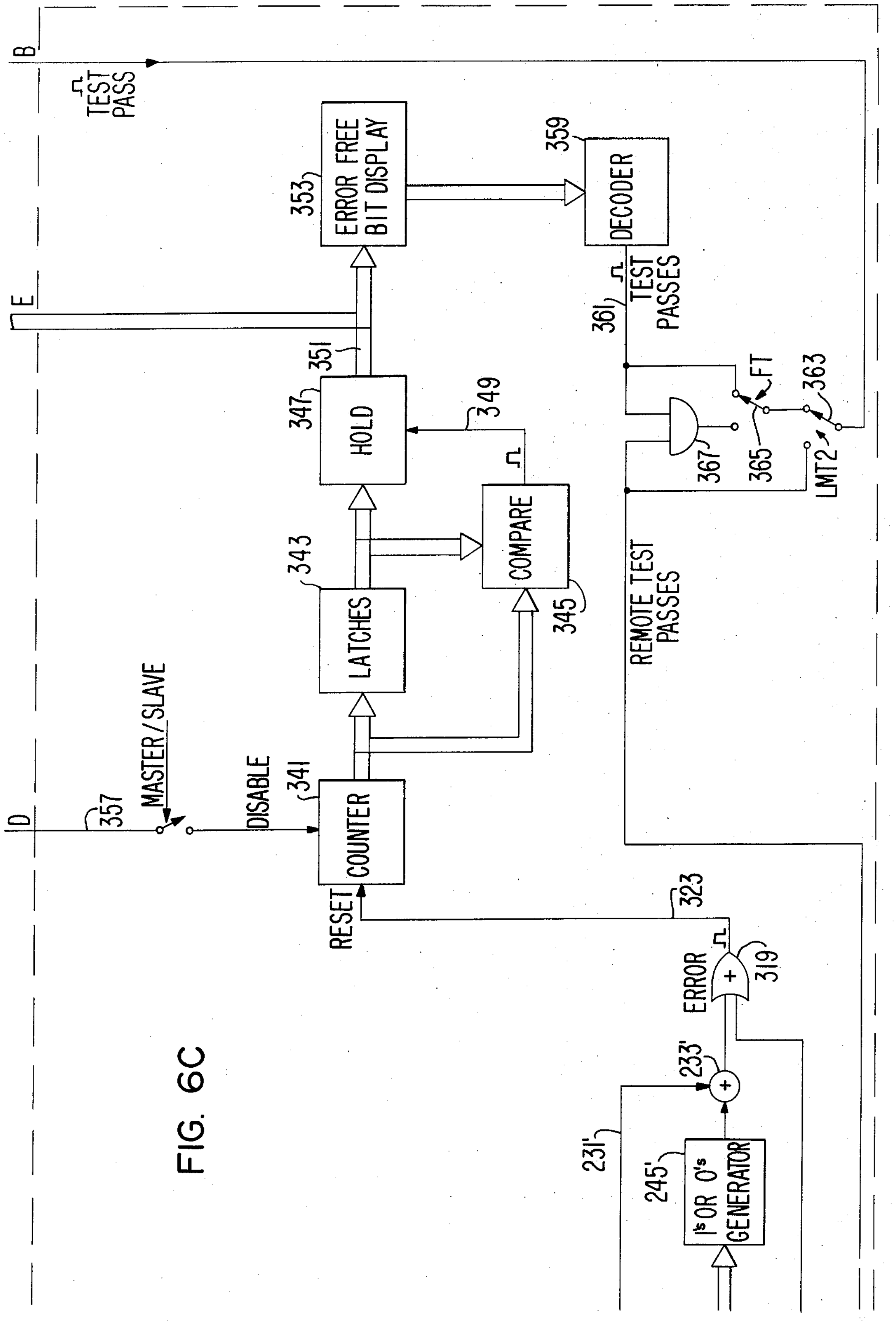

Referring to FIG. 1A, a test controller 39, to be described in detail with respect to FIG. 6, senses the status of the communication circuit and conducts all testing operations. A control line 41 causes switches 43 and 45 to switch out of the data transmission mode (DM) in response to a detected fault in one of the status lines 31, 33, 35 or 37 or upon the receipt of the proper tone combination from the opposite terminal in a line 47. When switched, the data transmission line 19 is removed from the modem and a send test pattern line 49 is substituted therefor. Similarly, the line 23 from the modem is removed from application to the terminal 15 by the switch 45 and fed into the test controller through a receive test pattern line 51. Simultaneously with such switching from the data mode to the test mode, an appropriate tone combination is sent through a line 53 and a line isolating amplifier 55 for connection with the line 11 to tell the test controller 39' at the opposite end of the line that it has switched into the test mode (TM). If the test controller 39' has not already switched from the data mode to the test mode, such a tone will cause it to do so by receipt through an amplifier 57 and line 47'.

The transmission test set at each end of the communication circuit of FIG. 1 is preferably, for convenience, identical in construction. However, certain differences in operation are provided between the test controllers 39 and 39'. Only one of the test controllers may conveniently command the automatic testing sequence. If both test controllers operated independently according to their programmed test sequence, they could possibly not operate together. Therefore, one of the test controllers is designated as a "master" and the other as a "slave." For purposes of discussion, it will be considered that the test controller 39 is the master and that the test controller 39' is the slave. Accordingly, the test controller 39 is in full control of the automatic testing operations while the test controller 39' has a primary function of following commands communicated to it from the test controller 39.

The first test that is conducted by the master controller 39 after a fault has been detected is a self test (ST). A self test command is emitted in a line 59 to cause switches 61 and 63 to change state in the manner shown in FIG. 1A and thus cause the send test pattern line 49 to be looped back to the receive test pattern line 51 of the test controller 39. In this manner, the test controller 39 is initially checked for operability before any further tests are conducted.

The next test in the automatic sequence that is conducted is a local modem test (LMT 1) which tests the operability and data quality of the modem 21. For this test, the test controller 39 emits the command signal in a line 65 that causes a switch 67 to be operated to place in attenuating pad 69 between the modem's output send and receive lines. This loopback of a test pattern as sent by the test controller through its line 49 is looped back on the telephone line side of the modem and received by the test controller in the line 51 in order to determine the data quality. If the initial self test passes satisfactorily and the local modem test does not pass, then it is determined that a fault exists in the modem 21.

The next test that is conducted is a line test (LT 2) wherein the test controller 39 commands the test controller 39' to emit a command signal in a line 71. This command signal operates a switch 73 which places the amplifier 57' across the telephone line to loop it back at the opposite end to the test controller 39. A test pattern sent by the test controller 39 through its line 49 is then received back by its line 51 for determining the quality of the data transmission over both telephone lines 11 and 13 as well as the operability of the modem 21.

The next test is a remote modem test (LMT 2) wherein the test controller 39 commands the test controller 39' to emit a command signal in a line 65'. This command signal operates a switch 67' to place the attenuator 69' across the telephone lines 11 and 13. The test controller 39' then sends a test pattern through the line 49' and receives the pattern through its line 51'. The quality of the test pattern is determined within the test controller 39' and this (receive error rate) is sent back to the test controller 39.

The final test that is conducted in the automatic sequence as controlled by the test controller 39 is a full test (FT). In this test, the test pattern emitted through the line 49 from the master test controller 39 is received by the test controller 39 through the line 51 and the data quality determined. The error rate of this received test pattern is transmitted back to the master controller 39 for display and use in determining whether the test passes or not. Simultaneously, and independently, a test pattern is sent by the slave controller 39' through its line 49' and received by the master controller 39 through its receive line 51. A receive error rate is displayed and utilized to determine whether the test passes or not. Independent data quality determinations are than made for the send and receive lines of the communication system. If full test passes, a data mode command is emitted in the line 53 from the test controller 39 which causes the controller 39' to return its switches 45' and 43' to a position connecting the modem 25 and the terminal 17. Simultaneously, the master controller 39 causes its switches 43 and 45 to return to the normal data mode connecting the terminal 15 in the modem 21. If full test (FT) does not pass, the above mentioned sequence of tests is repeated, thus maintaining a constant display of both tests that fail and those that pass so that the causes of failure can be quickly isolated for repair. The way in which this automatic sequencing occurs is described in more detail hereinafter.

Although the automatic test sequencing feature is primarily described with respect to the preferred embodiment, it is also desirable to provide means for manually initiating any one of the aforementioned tests by panel pushbutton operation. The specific construction of the test controllers 39 and 39' permit such manual operation.

With the test controller 39 designated as the master and the test controller 39' designated as the slave, certain lines and switches shown in FIGS. 1A and 1B will not be utilized in normal operation. For instance, the command lines 71' and switch 74', at the master end of the communication circuit, will not be normally operated. The switch 73 will be operated if the test controller 39 is changed to a slave and the controller 39' to a master. The switch 73 would then participate in conducting the line test (LT). Also, the self test (ST 2) command line 59' and operated switches 61' and 63' serve no function so long as the test controller 39' is operating as a slave to the test controller 39.

As explained hereinafter, the test controllers 39 and 39' are primarily digital in operation. The clock sources for most of the digital components of the test controllers are obtained from the transmit and receive clocks as utilized in their respective associated modems. These clock signals are communicated by lines 75 and 75'.

The digital test pattern that is sent by test pattern generators of the test controllers is illustrated generally in FIG. 2. A pseudo-random test pattern 77 is interrupted every 2,047 bits by a remote command/status message (RCSM) 79 that is 64 bits long. The RCSM serves a housekeeping function to communicate between the test controllers 39 and 39' with commands and reports of the status of various items. During the testing cycle, the RCSM, in this specific example, is sent only about 3 percent of the time while the pseudo-random test pattern 77 continues to be sent about 97 percent of the time. During the psedo-random test pattern, errors in data transmission are noted. For any given test to pass, the pseudo-random pattern must be received error-free for 10,000 bits within a fixed amount of time for the specific example being described. Therefore, the pseudo-random pattern 77 and the RCSM 79 are repeated a number of times for any one test. The frequent sending of an RCSM makes sure that the commands carried thereby are executed, for if one RCSM is omitted or for some reason ineffective, another one follows in a very short period of time.

Referring to FIG. 3, the information by each of the 64 bits of the RCSM is illustrated. The first 32 bits, one-half of the RCSM, contain a synchronizing pattern of bits arranged to have a very low probability of occurring in either normal data transmission or during the transmission of a pseudo-random test pattern. In the specific example being described 16 "0"'s followed by 16 "1"'s is the synchronizing pattern. As described hereinafter, this pattern time synchronizes a transmitter and receiver of a binary test pattern.

Four mode control bits that follow the synchronizing pattern in the RCSM of FIG. 3 convey to the remote test set the testing mode in which the test controller that is emitting the RCSM finds itself. Only four mode control words illustrated in FIG. 4 are sent in the four mode control bits of the RCSM of FIG. 3. This could, of course, be accomplished by two mode control bits. The added two bits are provided to make it less probable that an erroneous mode control command or status signal will be acted upon. For each of the mode control words as illustrated in FIG. 4, only one of the four mode control bits is caused to be true. If, for example, two mode control bits are true by some error in test pattern transmission, that mode control word will be not acted upon. Only those mode control words having only one bit true will be accepted and acted upon by the remote test unit.

One manual test bit follows the four mode control bits, as shown in FIG. 3. This tells a remote unit whether it is stepping through an automatic sequence or whether the various tests are being conducted by manual pushbutton operation. One slave bit follows the one manual test bit and merely indicates whether the generator of the RCSM is a master or a slave.

Following the slave bit is a five bit pattern command which takes a specific form illustrated in FIG. 5. The specific example of a transmission test set being described contains the flexibility of generating any one of six specific pseudo-random test patterns. As shown in FIG. 5, one of these patterns is a 2,047 bit pattern that is commanded by a pattern command word of all 0's. When this pattern command exists, the pseudo-random pattern generators in the transmission and receiving sections of the test controllers 39 and 39′ will be operating to generate a pattern that begins repeating after every 2,047 bits.

As shown in FIG. 5, other test patterns available in the specific example being described include a pattern of all 1's, a pattern of all 0's and alternating pattern of 1's and 0's (1/0), a 63 bit pseudo-random pattern and a 511 bit pseudo-random pattern. All test patterns are sent for 2,047 consecutive bits between RCSM. As in the case of the mode control word as discussed above, the pattern command word of the RCSM contains extra bits in order to reduce the chances of an erroneous pattern command being acted upon.

The last 16 bits of the RCSM of FIG. 3 sends four four-bit words to describe the test pattern error rate that is received by the test controller that is generating the RCSM. This status signal is utilized for displaying the receive error rate at the opposite end of the communication circuit from that where the test controller generating the RCSM is located.

FIG. 6 shows a detailed example of a preferred test controller 39 of FIG. 1A. A portion 81 of the FIG. 6 circuit enclosed in dashed outline monitors the tone commands sent from the test controller at the opposite end of the communication circuit, monitors the interchanged circuits 31, 33, 35 and 37 and determines whether the transmission test set should remain in its data mode (transparent to data being transmitted) or switch into the test mode whereby the transmission test set takes over transmitting and receiving test patterns. When switching from a data mode to a test mode, a switching signal is emitted in the line 41 and a tone is sent to the remote test controller in the line 53 telling it to go into its test mode.

An OR gate 83 having four inputs in the form of the lines 31, 33, 35 and 37 has an output 85 connected with a counter 87 so that when all of the interchange signals in the line 31, 33, 35 and 37 show proper system operation, the counter 87 is held at zero. When one of the signal lines 31, 33, 35 or 37 indicates a fault in the system, the voltage level in the line 85 changes and the counter 87 is permitted to count. An internal clock is provided in the counter 87 having about a one-second period. The counter 87 emits an overflow pulse in an output line 89 if permitted to count for approximately 50 seconds. The 50 second parameter can be altered quite easily, however, by changing the count of the counter 87 at which an overflow pulse is emitted.

The command tones in the line 47 received from the remote end of the communication circuit are applied to a tone detector 91 which emits a pulse output in the line 93 when a test mode command tone is received and an output in a line 95 when a data mode command is received. The combination of two particular single frequency tones within the voice bandwidth of normal telephone lines are designated to be sent along the communication circuit to command the transmission test set to go from the data mode into their test mode. A tone generator 97 is also provided in the unit of FIG. 6 for generating such a tone into the line 53 for commanding the remote terminal to go into its test mode.

A different distinct pair of single frequency tones are combined for a data mode command which, when received, generates a pulse in the line 95. The circuit of FIG. 6 also has a two tone data mode command generator 99 which emits an output for commanding the transmission test set at the remote end of the line to go from the test mode into the data mode. The tone detector 91 accepts only the particular designated pair of frequencies in generating each of its outputs 93 and 95 and must see this frequency for about 1 second followed by a period of silence of about 1 second. The generators 97 and 99 operate for about 1 second with a period of silence of about 1 second. The combination of only two distinct frequency signals and their relatively long time duration prevents false keying of the transmission test set between data and test modes when normal data or test pattern information is being transmitted along the telephone circuit.

Whenever a fault is detected by a pulse being generated in the line 89, the output of an OR gate 101 changes and causes the test mode command tone generator 97 to emit the tone. This output tone passes through a mixer 103 and into the the line 53. A test mode command is also generated when the test controller goes into its line test (LT 1) mode or its local modem test (LMT 1) mode. For these two tests, the slave test controller 39′ of FIG. 1B must certainly be in its test mode and the repetitive commands to that effect make sure that it is so switched just in case the first command tone did not get through to the remote slave test controller 39′.

An overflow pulse in the line 89 is also applied to an OR gate 105 whose output sets a flip-flop 107. The output of the flip-flop 107 is connected with the test mode command line 41. When the flip-flop 107 is set, the terminal 15 of FIG. 1A is removed from the circuit by operation of the switches 43 and 45. This action of switching the communication circuit into its test mode is also accomplished by a pulse in the line 93 which is applied to an input of the OR gate 105, a pulse which occurs when a remote unit emits a test mode command tone. A manual switch 109 is also provided on the panel of the transmission test set and provides a third input to the OR gate 105 for manually causing the system to go into the test mode.

The flip-flop 107 is reset by the output of an OR gate 111. When the flip-flop 107 is reset, the test mode command in the line 41 disappears and the system returns to its normal data mode of operation. Return to the data mode can be accomplished by a panel pushbutton 113 which forms one input of the OR gate 111. A second input of the OR gate 111 comes from the output of a one shot 115 which emits a pulse when a mode storage unit 117 returns to a data mode (DM) state as evidenced in an output line 119 which forms the input of the one shot 115. A mode storage unit 117 switches into its data mode on the happening of a number of events including a pulse being received in the output line 95 of the tone detector 91 and which is communicated to the mode storage unit 117 through a line 121. Conversely, the mode storage unit 117 is switched out of its data mode state by a change in the output of an AND gate 123 to which a line 125 from the test mode command line 93 is one input. The other input of the AND gate is connected with the data mode line 119. When the mode storage unit 117 is in its data mode and a test mode command pulse appears in the line 93, the mode storage unit 117 switches out of the data mode to begin a testing sequence to be described hereinafter. An output pulse of the one shot 115, in addition to resetting the flip-flop 107 also keys the data mode command tone generator 99 to command the remote test controller to go back into its data mode.

A test mode control circuit as enclosed by dashed lines is indicated by the reference number 127. Wherein the test/data mode control block 81 determines when the transmission test set is to change between its test mode and its data mode, the test mode control block 127 automatically sequences and determines which of the many tests are to be conducted when the test controller 39 has been placed into the test mode. Besides the output line 119, the mode storage circuit 117 contains five additional output lines, only one of which is energized at a time to step the transmission test set through its various tests. When a signal occurs in an output line 129, a full test (FT) is commanded. When proper output appears in the line 131, a local modem test (LMT 1) is commanded and the proper signal is applied to the line 65 to initiate that test. When a proper signal occurs in the output line 133, a line test (LT) is commanded. A switch 135 which is responsive to a slave/master manual switch in the interior of the transmission test set emits a command signal in the line 71′ only when the unit is acting as a slave. When designated as a master, no signal is emitted in the line 71′ but rather the line test (LT) command is communicated to the remote terminal in a manner described hereinafter.

When the proper output appears in the line 137, a self test (ST) command appears in the line 59. When the proper signal occurs in the output line 139, a remote modem test command (LMT 2) is communicated to the remote transmission test set. These various tests are conducted automatically one at a time in a manner to be described, or they may be manually instituted by appropriate pushbutton circuits controlled from the front panel of the transmission test set.

The state of the signals in the lines 119, 129, 131, 133, 137 and 139 is applied to a decoding circuit 141 which emits in its output lines 143 the next test that is to take place after the one commanded by the proper output line of the mode storage unit 117 is completed. The sequence resulting from the memory of the decoding circuit 141 is altered by the slave/master switch so that the sequence is different depending on whether the test controller is operated as a slave or a master. This next test in the programmed sequence, presented in the decoder output line 143, is stored in a latches circuit 145 in response to a test advance pulse in a line 147. The next test to be conducted is thus presented at output lines 149 of the latches circuit 145. The next test as presented in the lines 149 is one of two inputs to a switching circuit 151 which has an output 153 that is presented back to an input of the mode storage unit 117. If a selection signal in a line 155 transfers the input 149 to the lines 153, as is the case when the test controller is a master, a closed loop test sequencing circuit results. The next test as then presented in the line 153 is transferred to the output of the mode storage circuit 117 upon receipt of a strobe pulse in a line 157.

When the selection signal in the line 155 is changed, the switching circuit 151 selects an input 159 for presentation at its output 153 for controlling the next mode into which the test controller is placed at the next strobe pulse in the line 157. The signals in the line 159 are received from the remote test controller and are utilized only by the slave test controller.

The strobe pulse in the line 157 which selects a test command at an output line of the mode storage unit 117 according to the input presented at that instant in the lines 153, is received from the output of an OR gate 161. The strobe pulse in the line 157 can be emitted by a panel pushbutton 163 which provides one input to the OR gate 161. A pulse in the line 95 as commanded by the remote unit provides another input to the OR gate 161. The test mode command output pulse of the OR gate 105 provides a third gate to the OR gate 161. A line 165 carries a pulse when a given test passes, so as to advance onto the next test. Yet another input line 167 causes a strobe pulse output of the OR gate 161 when a counter 169 overflows. A switch 171 selects a 50 second time out, a 40 second or a 20 second time out of the counter 169. The 50 second time out is used when the test controller is a master and either the 40 or the 20 second period is selected when the test controller is a slave. The counter 169 is reset by a pulse at the output of a mixer 173 which has one input from the output of the one shot 115 and another input from the test advance line 147. The test advance line 147 is the output of a one shot delay circuit 175 that is fired by a strobe pulse in the line 157. Thus, the counter 169 is reset a short period after a strobe pulse 157 causes the mode storage unit 117 to advance the test controller onto a new test. The counter 169 itself can cause the next test in the sequence to occur if no other input is present to the OR gate 161 before the counter 169 times out at the time selected by the switch 171. As described hereinafter, if the test passes (that is, if the error rate of the test pattern transmitted through the system is below a specified level) then a pulse will occur in the line 165 prior to the counter 169 being timed out. However, if the test fails, no such pulse occurs in the line 165 and absent any other input, the test will be advanced in response to the overflow of the counter 169.

The mode storage unit 117 may consist of two 4-bit latches that are commercially available. The decoding circuit 141 may be three commercially available multiplexer circuits. The latches 145 may be two 4-bit latches. The switching circuit 151 may be two commercially available data selectors.

Figure 7:
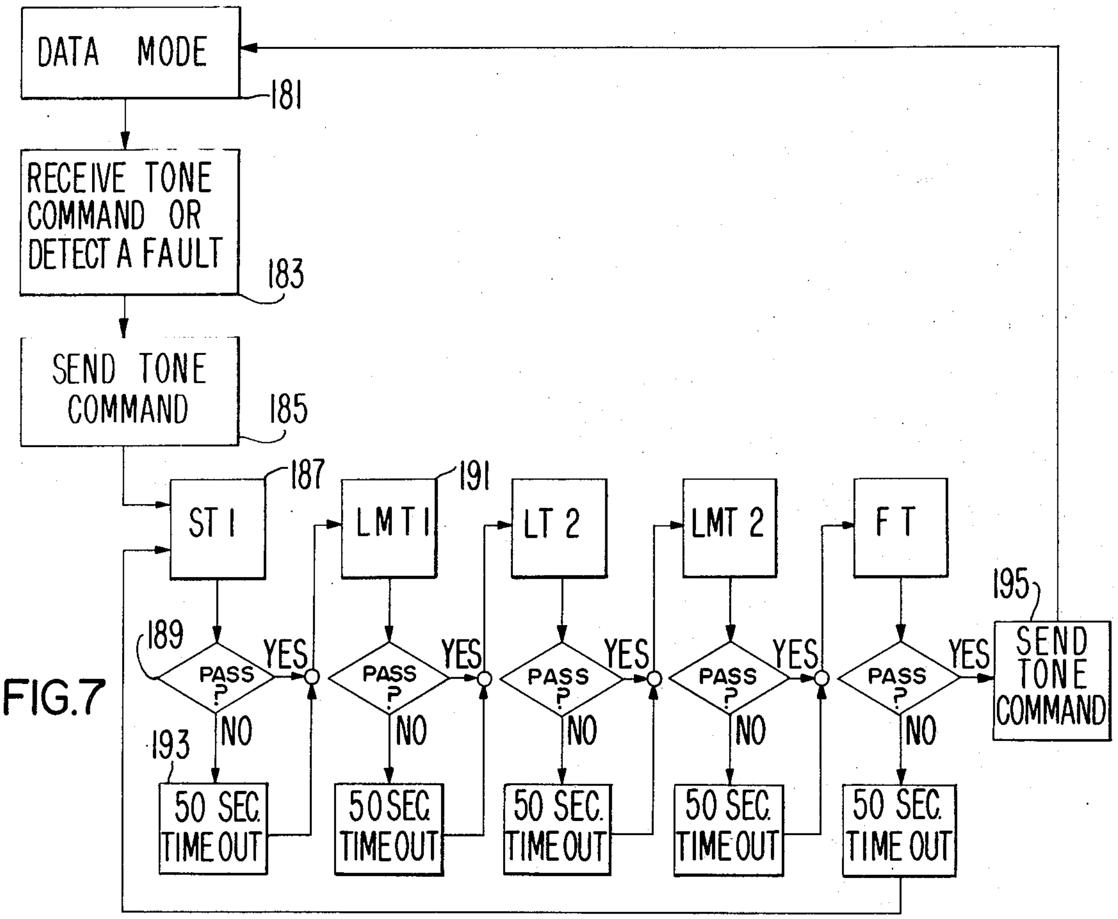
FIG. 7 illustrates automatic test sequencing of the preferred test controller of FIG. 6.
Figure 8:
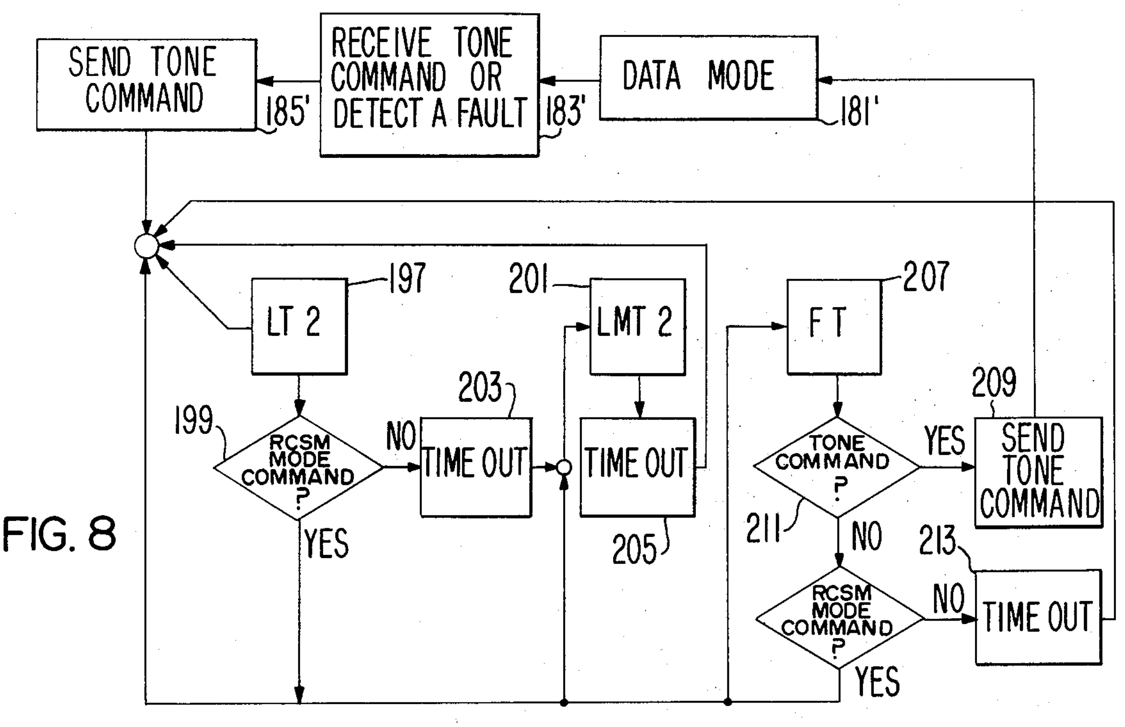
FIG. 8 illustrates a testing sequence of the tester of FIG. 6 when in another mode of operation.

The automatic sequencing of the mode control circuit blocks 81 and 127 are illustrated by flow diagrams of FIGS. 7 and 8. FIG. 7 shows the test sequencing of a master unit when the decoding circuit 141 receives a master input. FIG. 8 indicates the sequence of events when the decoder 141 receives a slave input. In both master and slave units, the normal data mode 181 (FIGS. 7 and 8) is changed to a test mode by the receipt of a tone command or a local detection of a fault as indicated by the block 183. Upon the receipt of a tone command or detection of a fault which switches the unit into the test mode, a test tone command 185 is in turn emitted.

After the test mode, a master unit, as illustrated with FIG. 7, switches initially into a self test mode 187. A test pattern of binary data is then transmitted, immediately looped back at the master test set and received by the receiving section of the test controller. It is determined whether the test passes or fails in a manner described hereinafter, as indicated by the block 187 of FIG. 7. If the test passes, the master unit sequences to the next test 191 which is a local modem test. That is, if the test passes, the command signal in the output line 137 of the mode storage unit 117 (FIG. 6) disappears and a local modem test command appears in the line 131. Simultaneously with test controller switching to its self test command mode, the counter 169 is reset and begins counting. If the test does not pass within the 50 second time period, as indicated by the block 193 of FIG. 7, the test is also advanced to the local modem of the block 191. This is caused by an overflow of the counter 169 of FIG. 6.

If the local modem test (LMT 1) passes or does not pass for 50 seconds, the output of the mode storage unit 117 of FIG. 6 is advanced to the line test (LT 2) command. Similarly, when the line test either passes or does not pass for 50 seconds, the output of the mode storage unit 117 is advanced to the remote modem test (LMT 2). When this either passes or does not pass for a period of 50 seconds, the unit advances to the full test (FT) mode. If the full test passes, a tone command indicated by the block 195 of FIG. 7 is emitted commanding the remote unit to go into the data mode and the unit being sequenced also returns to the data mode. If the full test fails, however, the testing sequence begins over again with the self test indicated by the block 187 of FIG. 7. This particular logical sequence is determined primarily by an appropriate connection of the three commercially available multiplexer units that form the decoding circuit 141. The output 143 of the decoding unit is advanced through the latches, the switching circuit 151 and back to the mode storage circuit 117 where it appears at the output lines in the mode storage circuit 117 at the next strobe pulse in the line 157.

When the test controller illustrated in FIG. 6 is operating with its master/slave switch in the slave position, the mode storage circuits 117 reflect primarily the commands received from the remote master unit through the line 159. That is, the selection signal 155 for a slave unit presents LMT 1, LT 1 and FT test commands to the mode storage unit 117. Referring to FIG. 8, a slave unit is switched into the line test (LT 2) mode immediately after the unit is switched from the data mode into the test mode. As indicated by the block 199, the mode storage circuit 117 (FIG. 6) is presented with the command signal in the line 159 and the output of the mode storage circuit 117 then switches to that remote command. However, if there is no such command, the unit is advanced to the LMT 2 test 201 when the counter 169 of FIG. 6 has produced an overflow pulse after either 20 or 40 seconds, depending on the position of the switch 171. The time out of the counter 169 is indicated by a block 203 of FIG. 8. When in the LMT 2 test state, another time out indicated by the block 205 returns by the command stored in the decoding circuit 141 to the line test (LT 2) state.

When a full test, as indicated by a block 207 of FIG. 8, is commanded remotely by a signal in the lines 159 (FIG. 6), the circuit will return to the data mode if a tone command to that effect has been received from the master unit. A data mode tone command as indicated by a block 209 of FIG. 8 is also sent when such a command is received from the master unit. When there is no tone command, as indicated by the block 211 of FIG. 8, the unit will select the test command presented from the remote master in the line 159. If there is no such remote command, a time out of the counter 169 occurs, as indicated by a block 213 of FIG. 8, and the slave test mode control circuit is returned to the line test (LT 2) mode.

Each test controller contains a transmitter contained in a block 215 of FIG. 6 and a receiver as contained in a block 217 of the test controller. The transmitter 215 generates the remote command/status message and a test pattern to be sent through the modem down the telephone line through the send line 49. The receiver 217 receives such a RCSM and test pattern, either from the remote test controller or from its own transmitter if the communication circuit being tested is looped back on itself.

The binary test pattern described with respect to FIGS. 2 and 3 is generated by the transmitter block 215 of FIG. 6. The pseudo-random pattern 77 of FIG. 2 is formed by a pattern generating shift register 219. The pattern generator 219 has, for the specific example being described herein, an eleven stage shift register. The outputs at various stages are combined through appropriate exclusive OR gates and applied to an output selecting switch 221 which selects among the shift register outputs 223, 225, 227 and 229. The selected output in a line 231 passes through a mixer 233 to terminal number 1 of a selection switch 235. When the switch 235 is connected with the terminal number 1, the pseudo-random test pattern as generated by the pattern generating shift register 219 is sent out of the test controller over circuit 49.

The output 231 of the output selector 221 is also looped back to an input 237 at the first stage of the pattern generating shift register 219. This output that is fed back to the input of the shift register includes the outputs of two stages which are combined in an exclusive OR gate 239 in an appropriate manner in order to generate a pattern 2,047 bits long before it repeats. Similarly, an exclusive OR gate 241 combines two shift register stage outputs in a manner to cause a pattern 511 bits long to be repetitively generated. An exclusive OR gate 243 combines to shift register stage outputs to generate a pseudo-random test pattern 63 bits in length before repetition when the output selector 221 connects the line 227 to the output line 231. The line 229 is connected to the output of the first shift register stage of the pattern generator 219 and provides for alternate 1's and 0's when connected to the output line 231 by the selector 221.

Two additional binary test patterns are not provided by the pattern generator 219. A separate generator 245 has an output circuit 247 which carries all 1's or 0's to the mixer 233 for application to a terminal 1 of the selector switch 235. The one of the several possible test patterns that is applied to terminal 1 of the switch 235 is selected by instrument panel switches 249 that control a binary encoder 251. The output of the encoder 251 is one of the pseudo-random test pattern command words listed in FIG. 5. Either one of the outputs of the pattern generator 219 is selected for application to the switch 235 or one of the two outputs of the pattern generator 245 is selected by the output of the encoder 251.

The 32 bit sync pattern of the RCSM illustrated in FIG. 3 is generated by a synchronous word generator 253. The generator 253 has an output that is applied to a terminal number 2 of the selecting switch 235. When the switch 235 is connected with the terminal 2, the sync word generator output is applied to the send test pattern line 49. The generator 253 provides alternate groups of 16 "1"'s and 16 "0"'s.

The remaining 32 bits of the RCSM of FIG. 3 is formed in a 32 bit RCSM register 255. The RCSM information of the last 32 bits is inserted in parallel into the register 255 and then advanced out serially through an output line 257 to a terminal 3 of the switch 235. Thus, when the switch 235 is in its number 3 position, the output of the RCSM 255 is fed into the communication circuit being tested. It is the register 255 which provides the command and status messages upon which the remote transmission test set will act.

The four mode control bits of the RCSM of FIG. 3 are derived from four output lines of the mode storage circuit 117 through a connecting circiut 259 (FIG. 6) The one manual test bit is controlled by a panel push-button 261. The one slave bit of the RCSM is similarly controlled by the slave/master switch 263 that is located preferably in the interior of the transmission test set.

The five pattern command bits of the RCSM of FIG. 3 are loaded into the register 255 (FIG. 6) from the output of the encoder 251 through lines 265. Sixteen bits carrying the four BCD words with a receive error rate are applied to the left-hand 16 stages of the register 255 through circuits 267 that are derived from the receiver 217 in a manner described hereinafter.

The binary test pattern having an alternating pseudo-random pattern and an RCSM as described with respect to FIGS. 2 and 3 is thus generated in the send test pattern line 49 by properly sequencing the switch 235 between its three positions.

A 2,047 bit counter 269 emits an overflow pulse in an output line 271 that causes the switch 235 to go to its position number 2. The switch 235 is in its position number 1 during the period that the counter 269 is operable. Therefore, the counter 269 assures that exactly 2,047 bits of test pattern are sent down the line 49 from either the pattern generator 219 or the generator 245, depending on the particular pattern selected. At the end of the pattern, the sync word generator 253 sends its 32 bit test pattern into the line 49. These 32 bits are timed by a counter 273 having an overflow output in the line 275 which causes the switch 235 to go to its position number 3. A divide by two circuit 277 receives the overflow pulse from the counter 273 and itself counts out 32 more bit times to emit a pulse 279 after this time which causes the switch 235 to go back to its position number 1 for sending a pseudo-random test pattern down the line.

A flip-flop 281 is set by the overflow pulse output of the counter 269 and resets by the pulse output of the divide by two circuit 277. An output 283 of the flip-flop is connected to disable the counter 269 when the flip-flop 281 is set. Thus, the counter 269 starts counting from 0 simultaneously with an output pulse in the line 279, causing the switch 235 to go into its position number 1 and by simultaneously resetting the flip-flop 281. A second output 285 of the flip-flop 281 disables the 32 bit counter 273 when the flip-flop 281 is reset. Thus the counter 273 begins counting at 0 as soon as the counter 269 has finished and has moved the switch 235 to its position number 2. Also, the output 283 of the flip-flop 281 is connected to the pattern generator shift register 219 through a line 287 for the purpose of holding each stage of the register in the generator 219 at 0 when the flip-flop 281 is set. This has the effect of holding the generator shift register stages 219 at 0 during the sending of the RCSM and thus the beginning of the pseudo-random pattern generated when the flip-flop 281 is reset always begins with all 0's in the register 219. Also, the pattern generator 219 is rendered inoperable during the remote modem test (LMT 2) by gating the transmit clock with an AND gate 289. During this test, it is the transmitter at the remote end that sends a pattern that is received by the receiver 217. During the other test modes, it is the transmitter 215 that transmits the pattern through the line 49 which is then looped back at some position in the communication circuit to its own receiver 217 for determination of a receive error rate of the binary test pattern.

The received test pattern in the line 51 from the remote test controller is loaded serially into a 32 bit RCSM register 293. All 32 positions of the register 293 are monitored in parallel by latches 295. The positions in the register 293 are also monitored in parallel by a sync word detector 297. When the 32 bit sync word of 16 0's and 16 1's appears in the RCSM register 293, the sync word detector 297 emits a comparison pulse at an output line 299 which starts a 32 bit counter 301 counting. An overflow pulse of the counter 301 in a line 303 causes the latches 295 to hold the 32 bits that are at that clock period existing in the register 293. Therefore, the 32 bits held in the latches 295 are the last 32 bits of the RCSM of FIG. 3 that immediately follow the detected synchronous pattern. While the counter 301 is counting in response to a recognition that the sync word has been received, these remaining 32 bits of the RCSM are being loaded into the register 293.

The four mode control bits held by the latches 295 are connected to a mode decoder 305 having the output line 159 that carries mode control commands from the remote test set. As discussed previously with respect to FIG. 4, a certain amount of redundancy is utilized in transmitting the mode control commands from one test controller to another in order to minimize the possibility of an erroneous mode control command being acted upon.

The one bit slave/master command of the RCSM stored in the latches 295 communicates with a decoder 307 which then supplies to the line 155 a signal representing whether the RCSM is coming from a remote slave unit or whether it is originating from the master transmitter 215 and being looped back to the receiver 217 through a portion of the communication circuit.

The five bit pattern command word of the RCSM of FIG. 3 as held in the latches 295 is connected with a decoding circuit 309 having an output line 311 which normally will carry one of the binary test pattern command words of FIG. 5. As discussed with respect to FIG. 5, redundancy is also provided in the pattern command words transmitted between test controllers to minimize the possibility that an erroneous pattern command word will be acted upon.

The 16 bit receive error rate information of the RCSM of FIG. 3 as held in the latches 295 of FIG. 6 is displayed on the panel of the master test controller, as indicated by a display block 313. A decoding circuit 315 also receives the 16 bit receive error rate information and emits a signal in an output line 317 when the number of bits received by the remote unit without an error exceeds 10,000, as will be explained hereinafter in more detail. The pulse in the line 317 indicates that the remote test has passed and the master unit has then sequenced onto the next test as explained hereinafter. The remote error display 313 and the decoding circuit 315 are actually used only when the test controller is operating as a master and further when in the remote modem test (LMT 2) and the full test (FT).

In order to determine the error rate of the test pattern received by the receiver 217 in its line 51, an exclusive OR gate 319 has one input connected to the incoming test pattern directly from the line 51 and a second input line 321 connected to the output of a pseudo-random pattern generator circuit similar to that in the transmitter 215. The pattern generated by the pseudo-random pattern generator of the receiver 217 is the same as that generated by the transmitter 215 or that of the remote test controller. When the comparison fails between the test pattern generated in the receiver 217 and that received through the line 51, a pulse is emitted in an output line 323 of the exclusive OR gate 319 during each bit time that an error occurs. It is these pulses in the line 323 that are utilized to calculate and display a received error rate.

A pattern generator 219' having eleven shift register stages serially connected is a major component of the pseudo-random test pattern generator of the receiver 217. Since the generator 219' and its associated components are counterparts of those previously described with respect to the transmitter 215 of FIG. 6, corresponding elements are indicated with the same reference characters with a "'" added.

Synchronization of the pattern generator 219' with a sync word received, and thus synchronization with the pattern generator 219 of the transmitter 215 or of the transmitter of a remote unit, is accomplished by a plurality of counters. A 2,047 bit counter 325 emits an overflow pulse which starts a 32 bit counter 327 counting. The overflow pulse of the counter 325 also sets a flip-flop 329. The flip-flop 329 has an output 331 that is connected to the counter 325 to disable it when the flip-flop 329 is set. Also, the output line 331 is applied to each of the 10 stages of the pattern generator shift register 219' to hold them in their 0 state when the flip-flop 329 is set. The flip-flop 329 is reset 64 bits later from an output pulse in a line 333 from a divide by two circuit 335 that is connected to the counter 327. An OR gate 337 receives the line 333 as one input and has a second input from the overflow line 303. Therefore, the flip-flop 329 is reset by a pulse in the line 303 which occurs one clock time prior to the beginning of the receipt of a pseudo-random test pattern. This keeps the clocks 325, 327 and 335 in synchronism with the transmitted pattern being received at the line 51.

A counter 341 is incremented in response to the receive clock but is reset to 0 each time an error pulse is generated in the line 323. An output of the counter 341 indicating the instantaneous count is applied to a latches circuit 343 and a comparison circuit 345. The latches circuit 343 holds the highest count that it sees in the counter 341. Such a held output is applied both to the comparison circuit 345 and to a special holding circuit 347. The latches 343 hold a fixed output equal to the highest count in the counter 341 until the counter 341 exceeds that fixed value at which time the output of the latches 343 follows the upward count of the counter 341. The comparison circuit 345 compares the output of the counter 341 with the output of the latches 343 and emits in a line 349 a command to the holding circuits 347 to hold at its output 351 the count value inputted into the circuit 347 whenever the counter 341 is not equal to the output of the latches 343. A display apparatus 353 receives the output of the holding circuit 343 and, thereby, displays the maximum number of error-free bits that have been received between successive errors. The value displayed in the circuit 353 will increase only when the counter 341 exceeds that value held by the holding circuit 347. The error-free bit signal in the line 351 is also fed to the RCSM register 255 in the transmitter 215 through circuits 267 for transmission to the remote end of the communication circuit for display on the remote error display device of that transmission test set.

When the test controller of FIG. 6 is operated as a master, the counter 341 can count good bits only when the slave is actually in the particular test mode commanded of it by the remote master unit. In order to insure that the slave is in the proper mode, a comparison circuit 355 is provided as part of the test mode control block 127 of FIG. 6. The comparison circuit 355 compares the remote status in the line 159 with the actual mode command being emitted in the slave unit at the output of the mode storage circuits 117. When there is not this comparison, a signal is emitted by the comparison circuits 355 in a line 357 which disables the counter 341. This prevents a high error rate determination that will result from the two test controllers operating in different modes. Only the errors caused by the faulty portion of the communication circuit are desired.

A decoding circuit 359 receives the value of the display 353 and emits a pulse in an output line 361 whenever the number of error free bits between errors exceeds 10,000. The pulse in the line 361 is a test path pulse which is then communicated by the line 165 to strobe OR gate 161 to increment the test mode control circuits 127 to the next programmed test. When in the remote modem test (LMT 2), however, the line 165 is not connected to the output line 361, but rather is connected through a switch 363 to the remote test pass line 317. Also, when in a full test (FT) mode, a switch 365 connects the test pass line 165 to the output of an AND gate 367 whose two inputs come from the local test pass line 361 and the remote test pass line 317. Therefore, in full test (FT) the test mode control circuits 127 can advance to the next program test on the basis of receiving a test pass signal only when both the transmission and receive tests are passed.

A test controller 39 of FIG. 1A has been particularly described with respect to FIGS. 6 and 7. The test controller 39' designated as a slave for purposes of the explanation herein, will have the same basic circuitry as explained with respect to FIG. 6 but with certain adaptations. The internal wiring at several positions previously described will be altered so that the automatic sequencing is in accordance with the flow diagram of FIG. 8. Additionally, the LMT 1 and LMT 2 output lines of the mode storage unit 117 will be interchanged for a slave unit.

It will be understood that the various switches in the Figures are intended to show function only and that actual mechanical switches may not be employed. Although relays are useful in certain circumstances, most of the switches discussed with respect to FIGS. 1 and 6 are semi-conductor logic switches of known arrangements.

The various aspects of the present invention have been described with respect to a preferred embodiment, but it will be understood that the invention is entitled to protection within the full scope of the appended claims.

We claim:

1. A binary data communications system, comprising:

a first data terminal connected to a first modem through first binary data transmit and receive lines at a first end of the communications system, a second data terminal connected to a second modem through second binary data transmit and receive lines at a second end of the communications system, a first telephone communications circuit between said first and second modems for operably communcating said first data transmit line with said second data receive line, a second telephone communications circuit between said second and first modems for operably communicating said second data transmit line to said first data receive line, a master system test set at the first end of said communications system that receives a plurality of interchange circuits from said first modem, said master test set including a binary test pattern generator, a binary test pattern receiver and means responsive to either a detected change in a signal in at least one of said first modem interchange circuits or an external command for connecting said master test pattern generator output to said first binary data transmit line, for connecting said receiver to said first data receive line and for emitting a remote command, whereby the first end of said communications system is placed in a test mode, and a slave system test set at the second end of said communications system that receives a plurality of interchange circuits from said second modem, said slave test set including a binary test pattern generator, a binary test pattern receiver and means responsive to either a detected change in signal in at least one of said second modem interchange circuits or to said remote command from the master test set for connecting said slave test pattern generator output to said second binary data transmit line, for connecting said slave receiver to said second data receive line and for emitting said external command, whereby the second end of said communications system is placed in a test mode.

2. The communications system of claim 1 wherein said external command received by the master test set originates from the slave test set as its said external command.

3. The communications system of claim 1 wherein said master test set includes test mode control means responsive to the first and second ends of the communications system being switched to a test mode for automatically testing various distinct segments of said communications system one at a time.

4. The communications system of claim 3 which additionally comprises means responsive to said test mode control means for looping said first and second telephone circuits together at said first end of the communications system, whereby the master binary pattern generator is looped back through said first modem to the master test pattern receiver.

5. The communications system of claim 3 wherein said test mode control means includes means for sending a remote command to the slave test set as a binary signal that is periodically inserted into said test pattern generator output, and further wherein said slave test set receiver includes means for isolating the remote command from the test pattern being received.

6. The communications system of claim 5 wherein the slave test set includes means responsive to the remote command isolated by its receiver for looping said first and second telephone circuits together at said second end of the communications system, whereby the master pattern generator is looped back through the telephone line to the master test pattern receiver.

7. The communications system of claim 3 wherein said slave test set additionally comprises means responsive to the slave receiver for periodically inserting into the slave test pattern generator output a status message pertaining to the quality of the data received, whereby the master test set is informed of said data quality.

8. The communications system of claim 1 wherein both the master and slave test sets each comprise means responsive to an external command signal or to receiving a test pattern with a satisfactory data quality for disconnecting its test pattern generator from its associated binary data transmission line and for disconnecting its receiver from said data receive line, whereby the test set is automatically switched out of its test mode into a data mode.

9. For use at one end of a digital data communications circuit having a data terminal communicating digitally with a modem by terminal send and receive lines, said modem interfacing said terminal send and receive lines with voice telephone send and receive lines, said data terminal and modem additionally being connected by a plurality of interchange circuits, a transmission test set comprising:

means for generating a digital test pattern, means receiving a digital test pattern for determining quality of the digital data received thereby, means receiving at least one of said interchange circuits for generating a fault signal after said at least one of said interchange circuits indicates a system failure for a predetermined period of time, and means responsive to said fault signal for switching said terminal send and receive lines from said data terminal to said generating and receiving means, respectively, whereby said generating means can then send a test pattern through said modem to said telephone send line and said receiving means can receive a test pattern from said telephone receive line after passing through said modem.

10. A test set according to claim 9 which additionally comprises means for looping back data send and receive paths of the communications circuit at a plurality of positions along the communications circuit at a plurality of positions along the communications circuit in order to isolate a cause of the system failure, said looping means providing means for automatically stepping the loop back from one position to another along the communications circuit upon determination by said test pattern receiving means that the error rate of the received test pattern is above accepted standards.

11. A test set according to claim 9 wherein said test pattern generating means includes means for transmitting alternately a pseudo-random digital test pattern and a digital status and command message, and further wherein said test pattern receiving means includes means for receiving a pseudo-random test pattern alternately with a binary status and command message, and further wherein said receiving means includes means for identifying and decoding the command and status message.

12. The test set according to claim 9 wherein said test pattern generating means includes a pseudo-random test pattern generator and further wherein said test pattern receiving means includes:

a pseudo-random test pattern generator of the same character as that in said test pattern generating means, means receiving the output of said receiver pseudo-random test pattern generator for comparison thereof with a received test pattern from the communications circuit, and means responsive to said comparison means for counting the number of good bits received from the communications circuit between unfavorably compared bits.

* * * * *